(12) United States Patent
Yao et al.

(10) Patent No.: US 8,689,642 B2
(45) Date of Patent: Apr. 8, 2014

(54) TORQUE SENSOR

(75) Inventors: Li-Ho Yao, Taipei (TW); Simon Fan, Hsinchu County (TW)

(73) Assignee: Li-Ho Yao, Taipei (TW)

( * ) Notice: Subject to any disclaimer, the term of this patent is extended or adjusted under 35 U.S.C. 154(b) by 344 days.

(21) Appl. No.: 13/303,391

(22) Filed: Nov. 23, 2011

(65) Prior Publication Data
US 2013/0086995 A1 Apr. 11, 2013

(30) Foreign Application Priority Data

Oct. 7, 2011 (TW) .............................. 100136388 A

(51) Int. Cl.
*G01L 3/02* (2006.01)

(52) U.S. Cl.
USPC ................. 73/862.31; 73/862.333; 73/862.08

(58) Field of Classification Search
USPC ...................... 73/862.191, 862.331–862.335, 73/862.324, 862.08, 862.29, 862.321
See application file for complete search history.

(56) References Cited

U.S. PATENT DOCUMENTS

| | | | | |
|---|---|---|---|---|
| 3,104,544 | A * | 9/1963 | Guiot | 73/862.322 |
| 4,356,732 | A * | 11/1982 | Hachtel et al. | 73/862.331 |
| 4,446,746 | A | 5/1984 | Aoshima | |
| 4,800,764 | A * | 1/1989 | Brown | 73/862.322 |
| 5,014,560 | A | 5/1991 | Hutchison | |
| 5,829,546 | A | 11/1998 | Tseng | |
| 5,941,333 | A | 8/1999 | Sun et al. | |
| 6,006,850 | A | 12/1999 | Yu | |
| 6,138,520 | A * | 10/2000 | Chang | 73/862.193 |
| 6,263,993 | B1 | 7/2001 | Lin | |
| 6,439,067 | B1 * | 8/2002 | Goldman et al. | 73/862.333 |
| 6,516,908 | B2 | 2/2003 | Tseng | |
| 6,684,971 | B2 | 2/2004 | Yu et al. | |
| 7,406,884 | B2 * | 8/2008 | Jerems et al. | 73/862.331 |
| 7,814,803 | B2 | 10/2010 | Akiyama et al. | |
| 7,845,243 | B2 | 12/2010 | Poirier et al. | |
| 8,047,084 | B2 | 11/2011 | Okuyama et al. | |
| 8,485,050 | B2 * | 7/2013 | Yao et al. | 73/862.31 |
| 2005/0160856 | A1 * | 7/2005 | Sugitani | 74/424.92 |

FOREIGN PATENT DOCUMENTS

| | | |
|---|---|---|
| JP | 46002239 | 10/1971 |
| JP | 56117331 | 2/1980 |
| JP | 57076428 | 5/1982 |
| JP | 57157861 | 9/1982 |
| JP | 58015135 | 1/1983 |
| JP | 05050221 | 7/1993 |
| JP | 07039314 | 2/1995 |
| JP | 8230756 | 9/1996 |
| JP | 08271358 | 10/1996 |

(Continued)

*Primary Examiner* — Lisa Caputo
*Assistant Examiner* — Jonathan Dunlap
(74) *Attorney, Agent, or Firm* — Ming Chow; Sinorica, LLC

(57) ABSTRACT

A torque sensor has an envelope tube, a middle cylinder mounted in the envelope tube, a inner cylinder mounted through the middle cylinder, a resilient element connected to the middle cylinder and the inner cylinder, a first disc and a second disc respectively attached to the inner cylinder and the middle cylinder, and a detection unit detecting a displacement angle of the second disc and the first disc to calculate a torque applied to the inner cylinder. The torque sensor has a simple structure, fast, sensitive and accurate torque sensing ability, and can be used on all kinds of mechanisms that rotate when a force is applied thereon to calculate and quantify amounts of energy and work of the exerciser according to the torque.

36 Claims, 13 Drawing Sheets

(56) References Cited

FOREIGN PATENT DOCUMENTS

| JP | 8313375 | 11/1996 |
| JP | 2003-252280 | 9/2003 |
| TW | 322157 | 12/1997 |
| TW | 372072 | 10/1999 |
| TW | M410879 | 9/2011 |
| WO | WO-2009/054161 | 4/2009 |

\* cited by examiner

TORQUE SENSOR

BACKGROUND OF THE INVENTION

1. Field of the Invention

The present invention relates to a torque sensor, especially to a torque sensor that detects torque applied to a cylinder.

2. Description of the Prior Art(s)

When a conventional torque converter or torque sensor operates, one side of the torque sensor has to stay stationary while the other is applied with the torque. Therefore the conventional torque converter or torque sensor is unable to detect stresses, such as torque, pressure or the like, that acting between two moving objects.

However, in many situations, determining the torque acting between two moving objects is required, especially two objects that rotate simultaneously. For example, on a human-powered bicycle, force exerted to pedals will transfer all the way along adjacent contacted objects, which are all moving simultaneously, and eventually reach a rear wheel. In this case, a conventional torque converter or sensor is nowhere to be installed and thus is unable to be used on a bicycle to detect and measure the force exerted by a rider.

Doing exercise on fashion bike or on cycling equipment is quite common to daily life, a big pity is that the strength or power of the user can not be easily determined and shown off, nor has further calculations of the amount of exercise been achieved.

To overcome the defects of the conventional torque sensor, the present invention provides a simple and reliable torque sensor to mitigate or obviate the aforementioned problems.

SUMMARY OF THE INVENTION

The main objective of the present invention is to provide a torque sensor. The torque sensor has an outer envelope tube, an inner middle cylinder mounted coaxially inside the envelope tube, an inner cylinder mounted coaxially inside and through the middle cylinder, a resilient element mounted in-between and connected to the middle cylinder and the inner cylinder, a first disc and a second disc respectively attached to the inner cylinder and the middle cylinder, and a signal detection unit used for detecting the shift angle difference between the second disc and the first disc so a torque applied to the inner cylinder is measured.

Any force exerted to the inner cylinder or the middle cylinder will be transmitted all the way to contacted adjacent objects. Take the case of exerting the force to the inner cylinder as an example. When the force is transmitted to the resilient element, the shape (spatial) change is arisen which allows the inner cylinder to rotate forward with an angle shift. The attached first disc is then also carried forward with the same shift angle. The stronger the force applied, the wider the angle shifted. Force will be transferred to the next contacted object adjacent to the resilient element, which is the middle cylinder. If the middle cylinder is extended with a sort of transmission mechanism such as the chainwheel on a bike, the force will eventually be transferred to a rear wheel. When a sufficient strength is built up, the bike will then move forward. The force along the pedal to the rear wheel is measured on the middle path by measuring the resilient element's spatial shape change. This method complies with the basic spirit of Hooke's law, but the spatial change is detected differently in a contactless way through the optical sensor.

The torque sensor has advantages such as a simple structure, fast response, high and accurate sensitivity and without power loss. The torque sensor can be applied to all kinds of mechanisms that rotate when a force is applied thereon, and then the amounts of strength and works of the exerciser can be calculated and quantified according to the measured torque.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
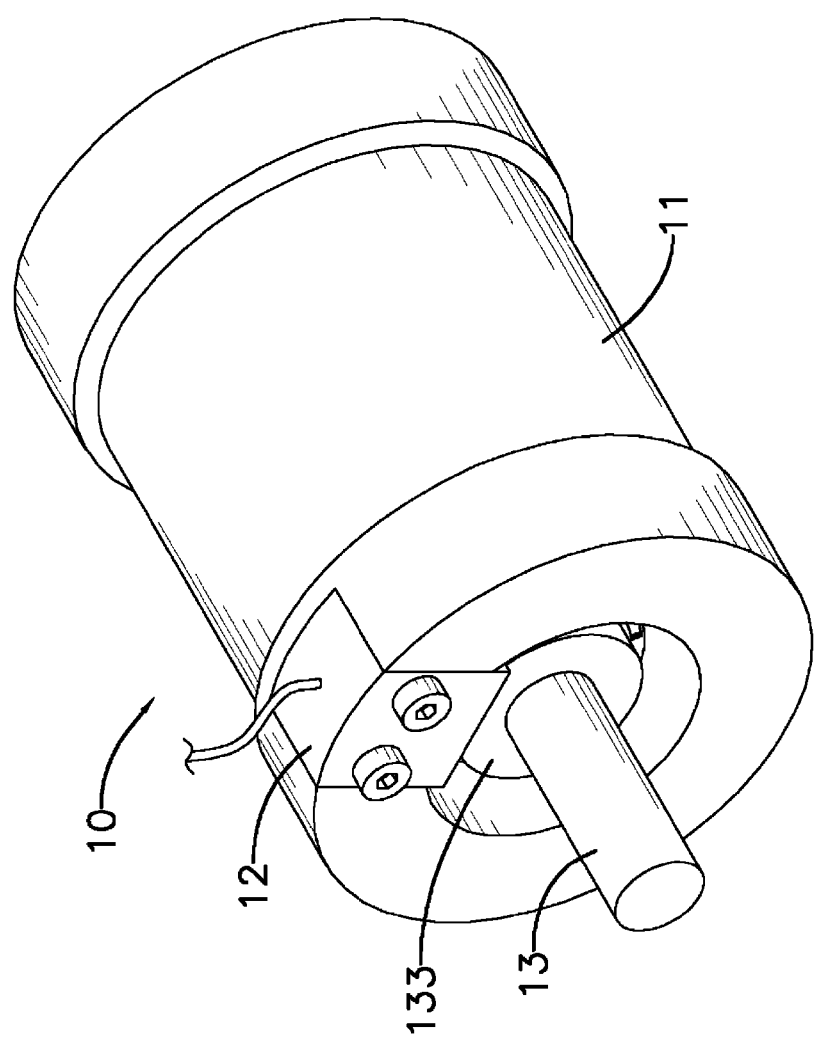
FIG. 1 is a perspective view of a torque sensor in accordance with the present invention.
Figure 2:
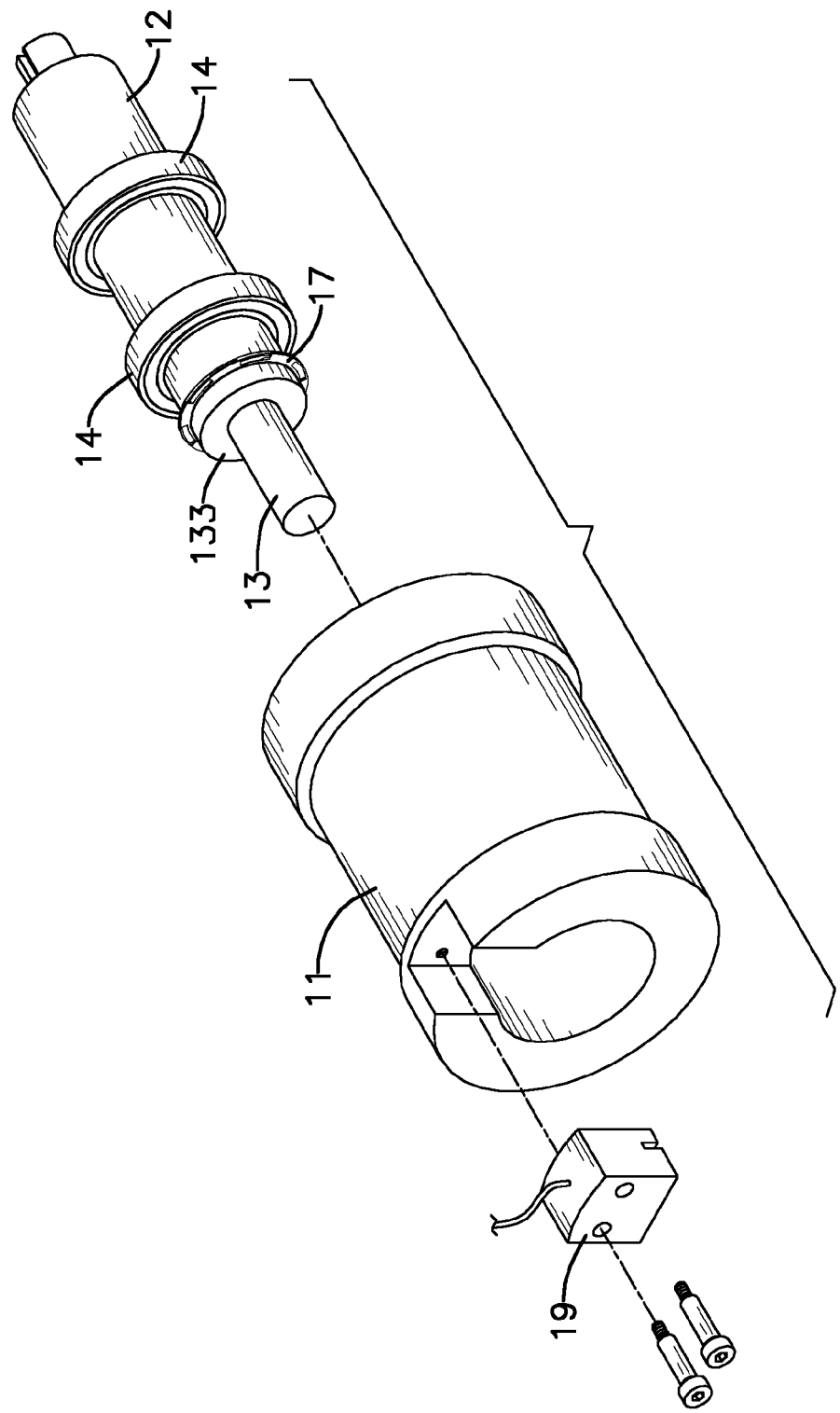
FIG. 2 is an exploded perspective view of the torque sensor in FIG. 1.
Figure 10:
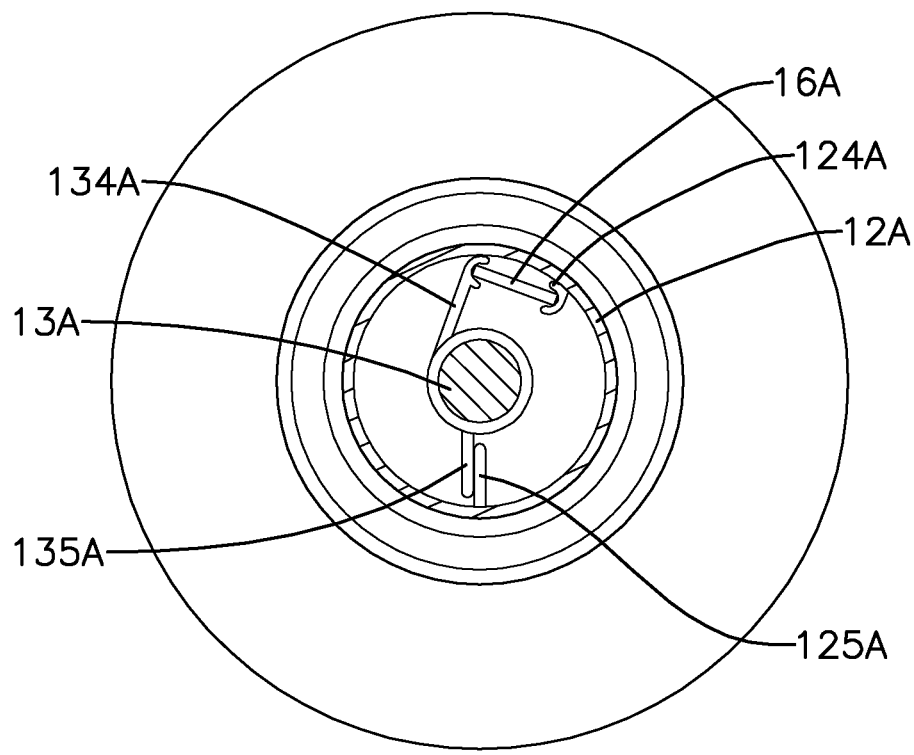
FIG. 10 is an end view in partial section of another embodiment of a torque sensor in accordance with the present invention.

With reference to FIGS. 1, 2 and 10, a torque sensor 10 in accordance with the present invention comprises an envelope tube 11, a middle cylinder 12, 12A, an inner cylinder 13, 13A, at least one outer bearing 14, at least one inner bearing 15, a resilient element 16, 16A, a first disc, a second disc and a detection unit 19.

Figure 5:
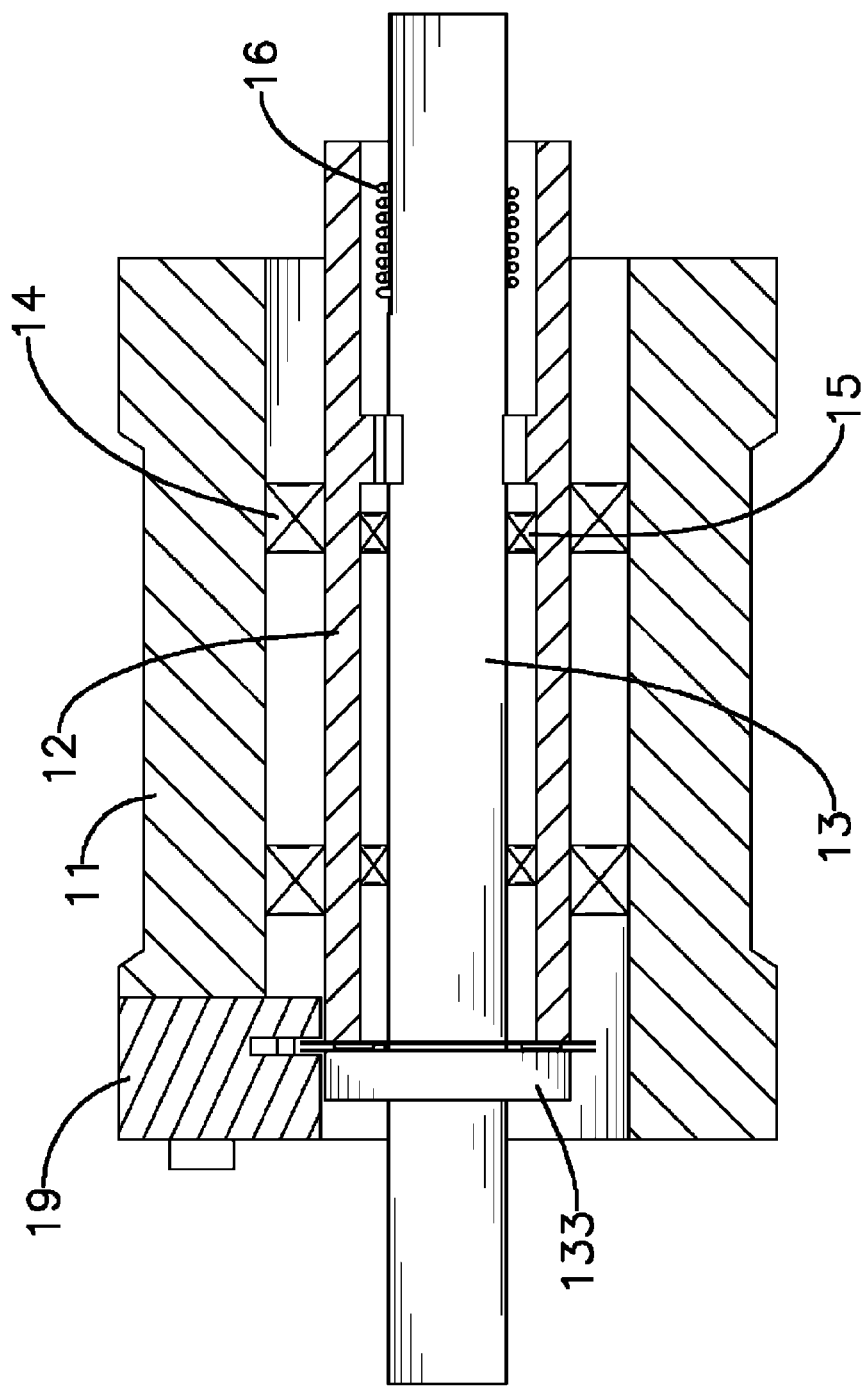
FIG. 5 is a side view in partial section of the torque sensor in FIG. 1.

With further reference to FIG. 5, the middle cylinder 12, 12A is axially mounted through the envelope tube 11, is coaxial with the envelope tube 11 and has a first end 121, a second end 122, a mounting slot 123, a first stop 124, 124A and a second stop 125, 125A. The mounting slot 123 of the middle cylinder 12 is formed in the second end 122 of the middle cylinder 12. The first stop 124, 124A of the middle cylinder 12, 12A is formed on an inner surface of the middle cylinder 12, 12A. The second stop 125, 125A of the middle cylinder 12, 12A is formed on the inner surface of the middle cylinder 12, 12A and is separated from the first stop 124, 124A of the middle cylinder 12, 12A.

The inner cylinder 13, 13A is axially mounted through the middle cylinder 12, 12A, is coaxial with the envelope tube 11 and has a first end 131, a second end 132, a mounting ring 133, a first stop 134, 134A, a second stop 135, 135A and a mounting slot 136. The first end 131 of the inner cylinder 13 corresponds to the first end 121 of the middle cylinder 12. The second end 132 of the inner cylinder 13 corresponds to the second end 122 of the middle cylinder 12. The mounting ring 133 is formed around an outer surface of the inner cylinder 13, is disposed adjacent to the first end 131 of the inner cylinder 13 and has a side surface facing the first end 121 of the middle cylinder 12.

Figure 4:
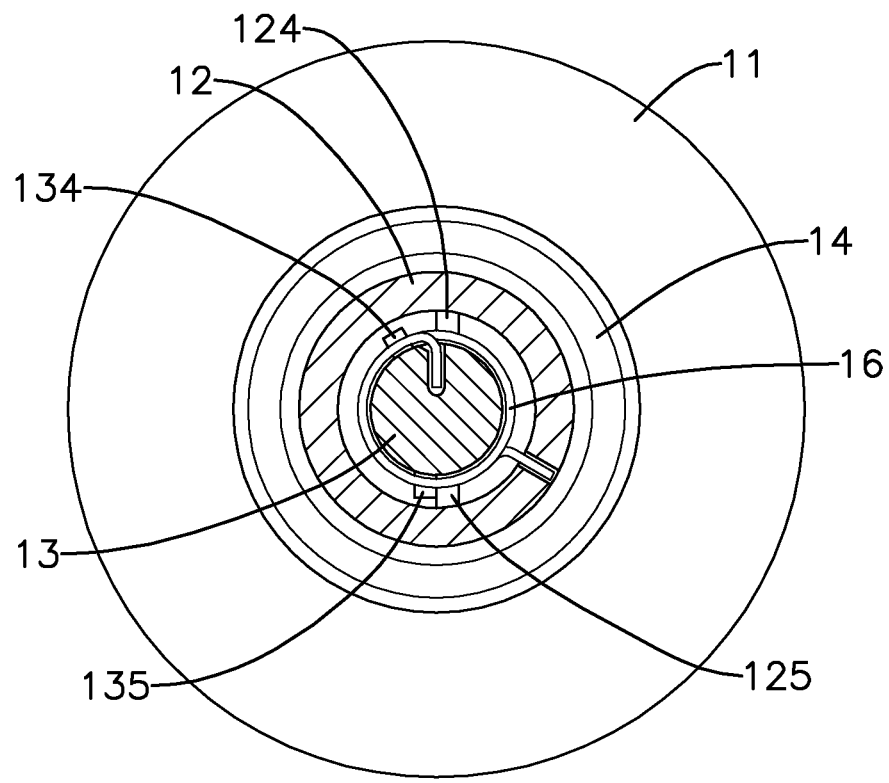
FIG. 4 is an end view in partial section of the torque sensor in FIG. 1.

With further reference to FIG. 4, the first stop 134, 134A of the inner cylinder 13, 13A is formed on the outer surface of the inner cylinder 13, 13A and is disposed between the first and second stops 124, 124A, 125, 125A of the middle cylinder 12, 12A. The second stop 135, 135A of the inner cylinder 13, 13A is formed on the outer surface of the inner cylinder 13, 13A, is separated from the first stop 134, 134A of the inner cylinder 13, 13A, is disposed between the first stop 134, 134A of the inner cylinder 13, 13A and the second stop 125, 125A of the middle cylinder 12, 12A.

The mounting slot 136 of the inner cylinder 13 is formed in the outer surface of the inner cylinder 13 and through the second end 132 of the inner cylinder 13.

The at least one outer bearing 14 is mounted around and between the envelope tube 11 and the middle cylinder 12, and is coaxial with the envelope tube 11. Each of the at least one outer bearing 14 has an outer surface and an inner surface. The outer surface of the outer bearing 14 is attached to an inner surface of the envelope tube 11. The inner surface of the outer bearing 14 is attached to an outer surface of the middle cylinder 12. Thus, the middle cylinder 12 and the envelope tube 11 are able to rotate relatively.

The at least one inner bearing 15 is mounted around and between the middle cylinder 12 and the inner cylinder 13, and is coaxial with the inner cylinder 13. Each of the at least one inner bearing 15 has an outer surface and an inner surface. The outer surface of the inner bearing 15 is attached to the inner surface of the middle cylinder 12. The inner surface of the inner bearing 15 is attached to the outer surface of the inner cylinder 13. Thus, the inner cylinder 13 and the middle cylinder 12 are able to rotate relatively.

The resilient element 16, 16A is disposed between the middle cylinder 12, 12A and the inner cylinder 13, 13A and has two ends respectively connected to the middle cylinder 12, 12A and the inner cylinder 13, 13A. Thus, the middle cylinder 12, 12A and the inner cylinder 13, 13A has a set relative position under a general condition. When the inner cylinder 13, 13A rotates, the inner cylinder 13, 13A pushes the resilient element 16, 16A and the middle cylinder 12, 12A sequentially so the middle cylinder 12, 12A rotates accordingly.

Figure 3:
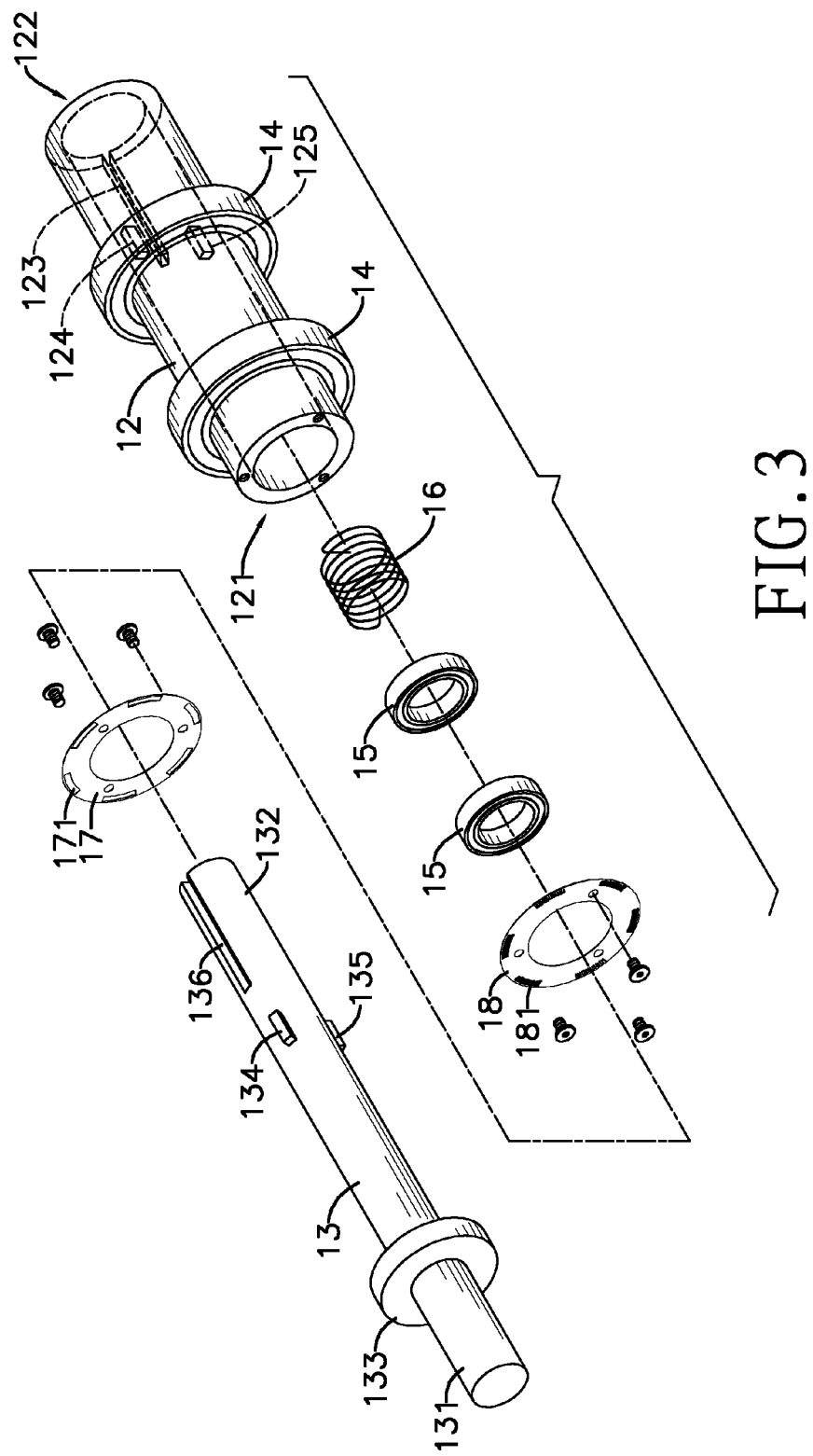
FIG. 3 is an enlarged exploded perspective view of the torque sensor in FIG. 1.

With reference to FIGS. 3 and 4, the resilient element 16 may be a torsion spring, mounted around the inner cylinder 13 and have two ends respectively connected to the middle cylinder 12 and the inner cylinder 13 and respectively mounted through the mounting slots 123, 136 of the middle cylinder 12 and the inner cylinder 13. The first stop 134 of the inner cylinder 13 selectively abuts the first stop 124 of the middle cylinder 12 and the second stop 135 of the inner cylinder 13 selectively abuts the second stop 125 of the middle cylinder 12 when the inner cylinder 13 rotates relative to the middle cylinder 12.

With reference to FIG. 10, the resilient element 16A may be compressible, may be a compression spring, is mounted between the first stops 124A, 134A of the middle cylinder 12A and the inner cylinder 13A and have two ends respectively abutting the first stops 124A, 134A of the middle cylinder 12A and the inner cylinder 13A. The second stop 135A of the inner cylinder 13A selectively abuts the second stop 125A of the middle cylinder 12A when the inner cylinder 13A rotates relative to the middle cylinder 12A.

Figure 6:
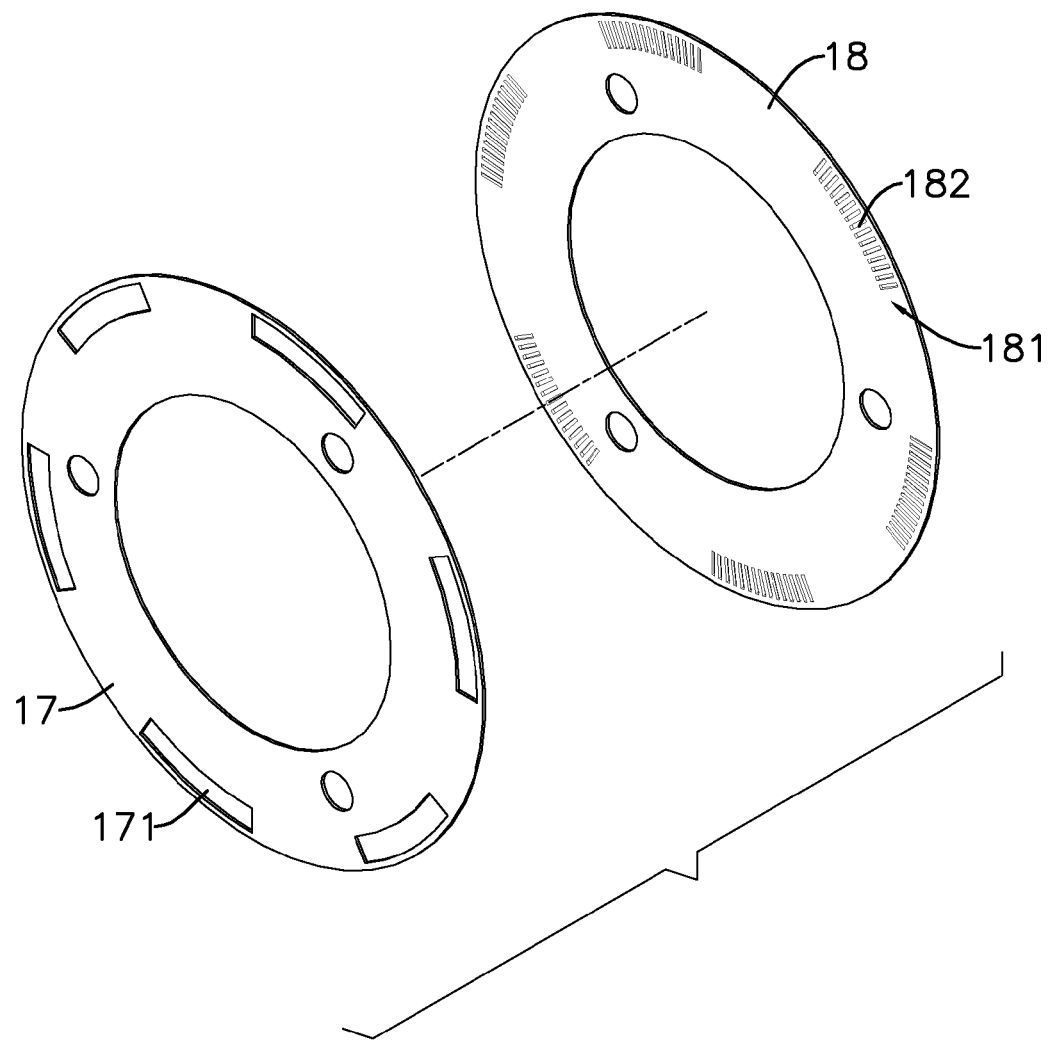
FIG. 6 is an exploded perspective view of a first disc and a second disc of the torque sensor in FIG. 1.
Figure 9:
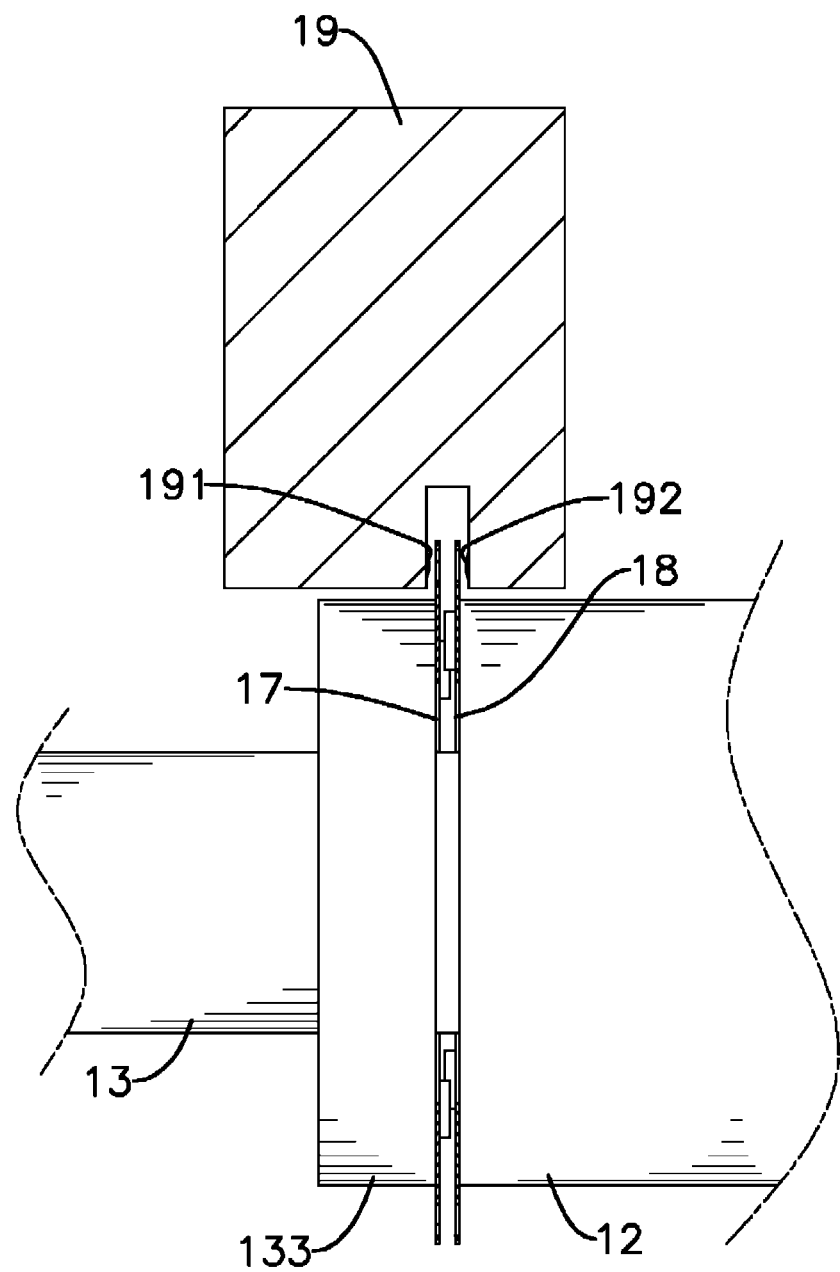
FIG. 9 is an enlarged side view in partial section of the torque sensor in FIG. 1, showing the first disc is a reference disc and the second disc is a mask disc.

With further reference to FIGS. 6 and 9, the first disc is annular, is mounted around the inner cylinder 13, is coaxial with the inner cylinder 13, is disposed between the mounting ring 133 of the inner cylinder 13 and the first end 121 of the middle cylinder 12 and is attached to the mounting ring 133 of the inner cylinder 13. The first disc may be a reference disc 17. The reference disc 17 has an outer peripheral edge and multiple through holes 171. The through holes 171 are separately formed through the reference disc 17 and are arranged along the outer peripheral edge of the reference disc 17.

The second disc is annular, is mounted around the inner cylinder 13, is coaxial with the inner cylinder 13, is disposed adjacent to the first disc and between the mounting ring 133 of the inner cylinder 13 and the first end 121 of the middle cylinder 12 and is attached to the first end 121 of the middle cylinder 12. The second disc may be a mask disc 18. The mask disc 18 has an outer peripheral edge and multiple detecting portions 181. The detecting portions 181 are separately formed on the mask disc 18 and are arranged along the outer peripheral edge of the mask disc 18. Each detecting portion 181 has multiple detecting grids 182 formed through the mask disc 18 and arranged along the outer peripheral edge of the mask disc 18.

Figure 13:
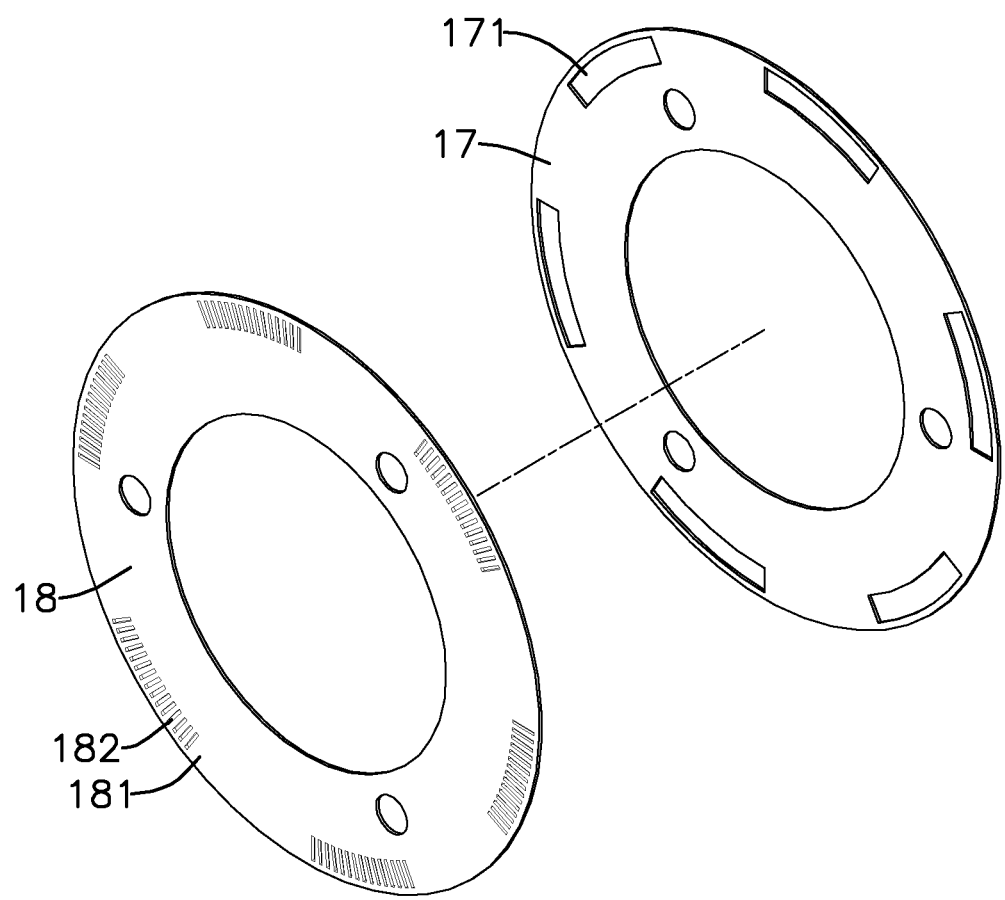
FIG. 13 is an exploded perspective view of a first disc and a second disc of another embodiment of a torque sensor in accordance with the present invention.
Figure 14:
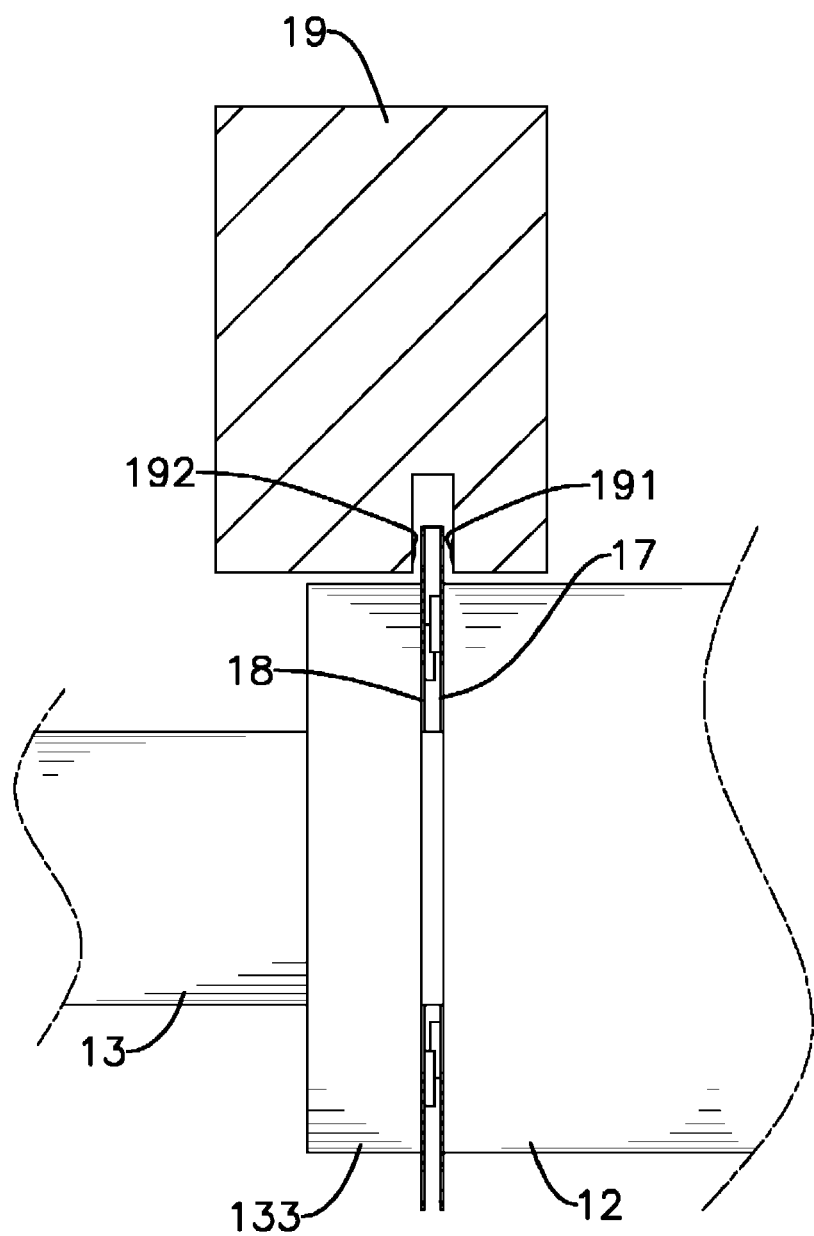
FIG. 14 is an enlarged side view in partial section of the torque sensor in FIG. 1, showing the second disc is a reference disc and the first disc is a mask disc.

Otherwise, with reference to FIGS. 13 and 14, the second disc may be the reference disc 17 and the first disc may be the mask disc 18. Thus, shift angle difference between the first disc and the second disc reflects shift angle difference between the middle cylinder 12 and the inner cylinder 13 and deformation of the resilient element 16, 16A.

The detection unit 19 is mounted on the envelope tube 11, detects the shift angle difference between the first disc and the second disc and has a signal emitter 191 and a signal receiver 192. The signal emitter 191 is disposed beside the reference disc 17 and sends signals to selectively pass through at least one of the through holes 171 of the reference disc 17. The signal receiver 192 is disposed beside the mask disc 18, aligns with the signal emitter 191 and selectively receives the signals sent from the signal emitter 191. When the reference disc 17 and the mask disc 18 rotate relative to each other, the signal receiver 192 may receive one signal at a time as small force is applied to the torque sensor 10 or the signal receiver 192 may receive multiple signals at a time as large force is applied to the torque sensor 10.

Figure 11:
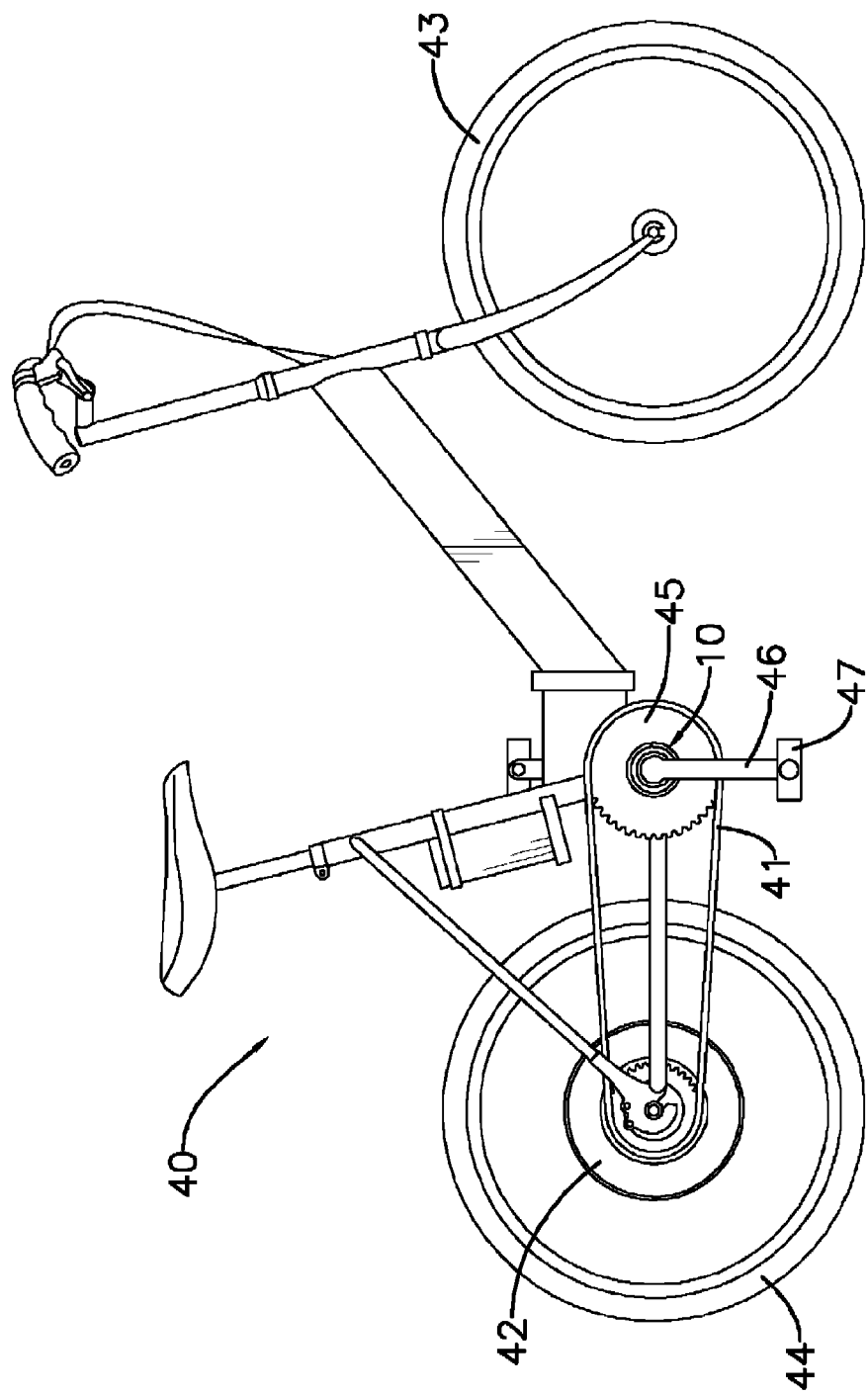
FIG. 11 is an operational side view of the torque sensor in FIG. 1, showing mounted on a power-assisted bicycle.

With further reference to FIG. 11, the torque sensor 10 as described may be mounted in a bottom bracket of a power-assisted bicycle 40. A chainwheel 45 is securely mounted around one of the ends 121, 122 of the middle cylinder 12. A chain 41 is mounted around and engages the chainwheel 45. Two cranks 46 are respectively connected securely to the first and second ends 131, 132 of the inner cylinder 13. Two pedals 47 are respectively connected rotatably to the cranks 47 to allow a rider to pedal the power-assisted bicycle 40.

When the rider works the pedals 47 to rotate the cranks 46 and the inner cylinder 13, the inner cylinder 13 further pushes the resilient element 16, 16A to rotate the middle cylinder 12 and the chainwheel 45. Consequently, the first disc rotates along with the inner cylinder 13 and the second disc rotates along with the middle cylinder 12.

With reference to FIG. 4, when the force applied to the torque sensor 10 reaches a maximum detecting range of the torque sensor 10, the first stops 134, 124 of the inner cylinder 13 and the middle cylinder 12 abut each other. When no force is applied to the torque sensor 10, the resilient element 16 causes the second stops 135, 125 of the inner cylinder 13 and the middle cylinder 12 abut each other.

Figure 7:
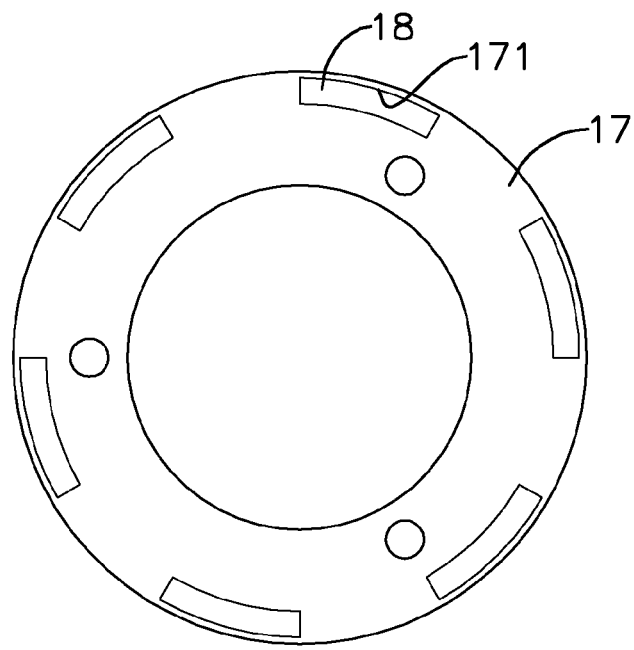
FIG. 7 is a front view of the first disc and the second disc in FIG. 6, shown overlapped.

With further reference to FIG. 7, the detecting portions 181 of the mask disc 18 are respectively disposed between the through holes 171 of the reference disc 17. Thus, under the general condition, the signal receiver 192 of the detecting unit 19 does not receive the signal sent from the signal emitter 191.

Figure 8:
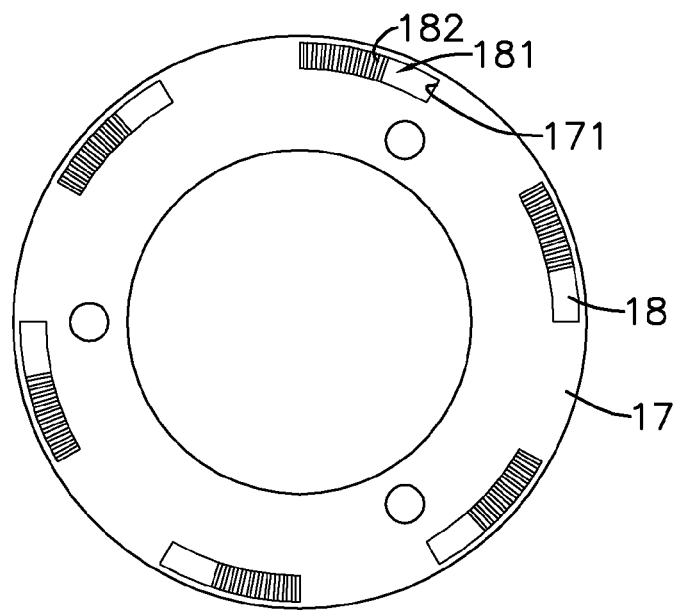
FIG. 8 is an operational front view of the first disc and the second disc in FIG. 6, shown relatively rotated.

With further reference to FIG. 8, when the power-assisted bicycle 40 is riding up on a slope or is about to speed up, the rider has to apply more power to pedal the pedals 47 of the power-assisted bicycle 40. The resilient element 16, 16A is twisted or compressed. Then, the mask disc 18 rotates relative to the reference disc 17. The detecting portions 181 of the mask disc 18 are respectively revealed in the through holes 171 of the reference disc 17. Thus, the signal receiver 192 of the detection unit 19 receives the signal sent from the signal emitter 191 through the detecting grids 182 of each detecting portion 181. Number of the detecting grids 182 of each detecting portion 181 that are revealed in a corresponding through hole 171 of the reference disc 17 can be counted by counting number of the signals received by the signal receiver 192. Accordingly, an angle by which the mask disc 18 rotates relative to the reference disc 17 and the force that is applied to the torque sensor 10 are also calculated.

Moreover, according to the angle by which the mask disc 18 rotates relative to the reference disc 17, the detection unit 19 sends a signal to a controller to allow the controller to activate and control an electric motor 42 mounted on the power-assisted bicycle 40. The electric motor 42 may drive a front wheel 43 or a rear wheel 44 of the power-assisted bicycle 40. Then, the electric motor 42 assists the rider to ride the power-assisted bicycle 40. Therefore, no matter whether the power-assisted bicycle 40 is riding up on a slope or is about to speed up, the rider applies a constant power to the power-assisted bicycle 40, is not tired and achieves a constant exercising effect.

Furthermore, the detecting portions 181 of the mask disc 18 may respectively correspond to the through holes 171 of the reference disc 17. Thus, the detection unit 19 may also detect the angle by which the mask disc 18 rotates relative to the reference disc 17.

Figure 12:
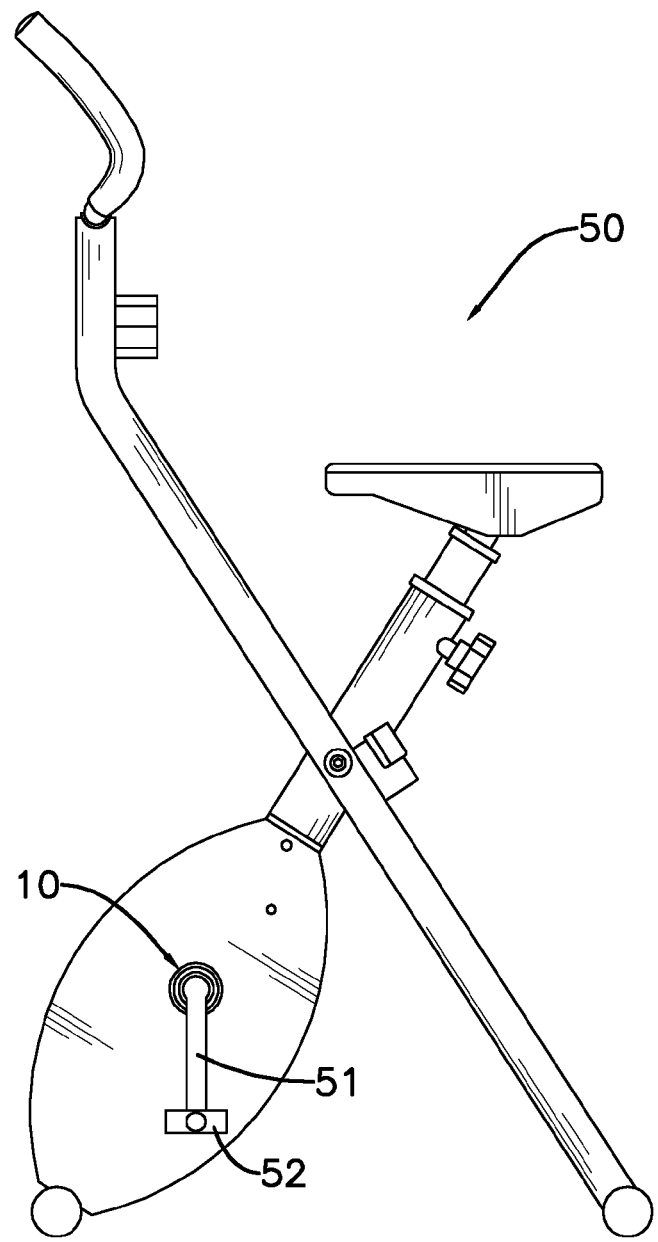
FIG. 12 is another operational side view of the torque sensor in FIG. 1, showed mounted on an exercise bicycle.

With further reference to FIG. 12, the torque sensor 10 as described may be mounted in a non-powered bicycle or an exercise bicycle 50. Two cranks 51 of the exercise bicycle 50 are respectively connected securely to the first and second ends 131, 132 of the inner cylinder 13. Two pedals 52 of the exercise bicycle 50 are respectively connected rotatably to the cranks 51. When an exerciser pedals the pedals 52 of the exercise bicycle 50, the torque sensor 10 detects a torque applied to the exercise bicycle 50 and therefore an amount of exercise of the exerciser is calculated. Moreover, the amount of exercise or torque can be shown on a control panel of the exercise bicycle 50 or can transmitted to a smart phone to record or analyze the amount of exercise or physical capability of the exerciser.

In the above-mentioned applications, the inner cylinder 13 serves as a torque receiver and transmits the force to the middle cylinder 12 through the resilient element 16, 16A. However, otherwise, the middle cylinder 12 may also serve as the torque receiver and transmits force to the inner cylinder 13 through the resilient element 16, 16A.

The torque sensor 10 as described has a simple structure and fast, sensitive and accurate torque sensing ability. The torque sensor 10 can be used on all kinds of mechanisms that rotate when a force is applied thereon to detect torque acting on the mechanism so amounts of energy and work of the exerciser are calculated and quantified. Since the torque sensor 10 consumes little energy, the torque sensor 10 has precise measuring function.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A torque sensor comprising
    an envelope tube;
    a middle cylinder axially mounted through the envelope tube;
    an inner cylinder axially mounted through the middle cylinder;
    at least one outer bearing mounted around and between the envelope tube and the middle cylinder;
    at least one inner bearing mounted around and between the middle cylinder and the inner cylinder;
    a resilient element disposed between the middle cylinder and the inner cylinder and having two ends respectively connected to the middle cylinder and the inner cylinder;
    a first disc being annular, and mounted around and attached to the inner cylinder;
    a second disc being annular, mounted around the inner cylinder, disposed adjacent to the first disc and attached to the middle cylinder; and
    a detection unit mounted on the envelope tube and detecting shift angle difference between the first disc and the second disc.

2. The torque sensor as claimed in claim 1, wherein
    the first disc is a reference disc having multiple through holes separately formed through the reference disc and arranged along an outer peripheral edge of the reference disc;
    the second disc is a mask disc having multiple detecting portions separately formed on the mask disc and arranged along an outer peripheral edge of the mask disc, each detecting portion having multiple detecting grids formed through the mask disc and arranged along the outer peripheral edge of the mask disc; and
    the detection unit having
        a signal emitter sending signals to pass through the through holes of the reference disc; and
        a signal receiver selectively receiving the signals sent from the signal emitter.

3. The torque sensor as claimed in claim 2, wherein the resilient element is a torsion spring, is mounted around the inner cylinder and has two ends respectively connected to the middle cylinder and the inner cylinder.

4. The torque sensor as claimed in claim 3, wherein
    the middle cylinder has
        a first stop formed on an inner surface of the middle cylinder; and
        a second stop formed on the inner surface of the middle cylinder and separated from the first stop of the middle cylinder; and
    the inner cylinder has
        a first stop formed on an outer surface of the inner cylinder, and disposed between the first and second stops of the middle cylinder; and
        a second stop formed on the outer surface of the inner cylinder, separated from the first stop of the inner cylinder, disposed between the first stop of the inner cylinder and the second stop of the middle cylinder and selectively abutting the second stop of the middle cylinder.

5. The torque sensor as claimed in claim 4, wherein
the middle cylinder further has a mounting slot formed in one of two ends of the middle cylinder;
the inner cylinder further has a mounting slot formed in the outer surface of the inner cylinder and through one of two ends of the inner cylinder; and
the ends of the resilient element are respectively mounted through the mounting slots of the middle cylinder and the inner cylinder.

6. The torque sensor as claimed in claim 4, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

7. The torque sensor as claimed in claim 3, wherein
the middle cylinder further has a mounting slot formed in one of two ends of the middle cylinder;
the inner cylinder further has a mounting slot formed in the outer surface of the inner cylinder and through one of two ends of the inner cylinder; and
the ends of the resilient element are respectively mounted through the mounting slots of the middle cylinder and the inner cylinder.

8. The torque sensor as claimed in claim 3, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

9. The torque sensor as claimed in claim 2, wherein
the middle cylinder has
a first stop formed on an inner surface of the middle cylinder; and
a second stop formed on the inner surface of the middle cylinder and separated from the first stop of the middle cylinder; and
the inner cylinder has
a first stop formed on an outer surface of the inner cylinder, and disposed between the first and second stops of the middle cylinder; and
a second stop formed on the outer surface of the inner cylinder, separated from the first stop of the inner cylinder, disposed between the first stop of the inner cylinder and the second stop of the middle cylinder and selectively abutting the second stop of the middle cylinder.

10. The torque sensor as claimed in claim 9, wherein the resilient element is compressible, is mounted between the first stops of the middle cylinder and the inner cylinder and has two ends respectively abutting the first stops of the middle cylinder and the inner cylinder.

11. The torque sensor as claimed in claim 10, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

12. The torque sensor as claimed in claim 9, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

13. The torque sensor as claimed in claim 2, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

14. The torque sensor as claimed in claim 1, wherein
the second disc is a reference disc having multiple through holes separately formed through the reference disc and arranged along an outer peripheral edge of the reference disc;
the first disc is a mask disc having multiple detecting portions separately formed on the mask disc and arranged along an outer peripheral edge of the mask disc, each detecting portion having multiple detecting grids formed through the mask disc and arranged along the outer peripheral edge of the mask disc; and
the detection unit having
a signal emitter sending signals to pass through the through holes of the reference disc; and
a signal receiver selectively receiving the signals sent from the signal emitter.

15. The torque sensor as claimed in claim 14, wherein the resilient element is a torsion spring, is mounted around the inner cylinder and has two ends respectively connected to the middle cylinder and the inner cylinder.

16. The torque sensor as claimed in claim 15, wherein
the middle cylinder has
a first stop formed on an inner surface of the middle cylinder; and
a second stop formed on the inner surface of the middle cylinder and separated from the first stop of the middle cylinder; and the inner cylinder has
- a first stop formed on an outer surface of the inner cylinder, and disposed between the first and second stops of the middle cylinder; and
- a second stop formed on the outer surface of the inner cylinder, separated from the first stop of the inner cylinder, disposed between the first stop of the inner cylinder and the second stop of the middle cylinder and selectively abutting the second stop of the middle cylinder.

17. The torque sensor as claimed in claim 16, wherein
the middle cylinder further has a mounting slot formed in one of two ends of the middle cylinder;
the inner cylinder further has a mounting slot formed in the outer surface of the inner cylinder and through one of two ends of the inner cylinder; and
the ends of the resilient element are respectively mounted through the mounting slots of the middle cylinder and the inner cylinder.

18. The torque sensor as claimed in claim 16, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

19. The torque sensor as claimed in claim 15, wherein
the middle cylinder further has a mounting slot formed in one of two ends of the middle cylinder;
the inner cylinder further has a mounting slot formed in the outer surface of the inner cylinder and through one of two ends of the inner cylinder; and
the ends of the resilient element are respectively mounted through the mounting slots of the middle cylinder and the inner cylinder.

20. The torque sensor as claimed in claim 15, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

21. The torque sensor as claimed in claim 14, wherein
the middle cylinder has
- a first stop formed on an inner surface of the middle cylinder; and
- a second stop formed on the inner surface of the middle cylinder and separated from the first stop of the middle cylinder; and the inner cylinder has
- a first stop formed on an outer surface of the inner cylinder, and disposed between the first and second stops of the middle cylinder; and
- a second stop formed on the outer surface of the inner cylinder, separated from the first stop of the inner cylinder, disposed between the first stop of the inner cylinder and the second stop of the middle cylinder and selectively abutting the second stop of the middle cylinder.

22. The torque sensor as claimed in claim 21, wherein the resilient element is compressible, is mounted between the first stops of the middle cylinder and the inner cylinder and has two ends respectively abutting the first stops of the middle cylinder and the inner cylinder.

23. The torque sensor as claimed in claim 22, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

24. The torque sensor as claimed in claim 21, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

25. The torque sensor as claimed in claim 14, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

26. The torque sensor as claimed in claim 1, wherein the resilient element is a torsion spring, is mounted around the inner cylinder and has two ends respectively connected to the middle cylinder and the inner cylinder.

27. The torque sensor as claimed in claim 26, wherein
the middle cylinder has
- a first stop formed on an inner surface of the middle cylinder; and
- a second stop formed on the inner surface of the middle cylinder and separated from the first stop of the middle cylinder; and the inner cylinder has
- a first stop formed on an outer surface of the inner cylinder, and disposed between the first and second stops of the middle cylinder; and
- a second stop formed on the outer surface of the inner cylinder, separated from the first stop of the inner cylinder, disposed between the first stop of the inner cylinder and the second stop of the middle cylinder and selectively abutting the second stop of the middle cylinder.

28. The torque sensor as claimed in claim 27, wherein
the middle cylinder further has a mounting slot formed in one of two ends of the middle cylinder;
the inner cylinder further has a mounting slot formed in the outer surface of the inner cylinder and through one of two ends of the inner cylinder; and
the ends of the resilient element are respectively mounted through the mounting slots of the middle cylinder and the inner cylinder.

29. The torque sensor as claimed in claim 27, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

30. The torque sensor as claimed in claim 26, wherein
the middle cylinder further has a mounting slot formed in one of two ends of the middle cylinder;
the inner cylinder further has a mounting slot formed in the outer surface of the inner cylinder and through one of two ends of the inner cylinder; and
the ends of the resilient element are respectively mounted through the mounting slots of the middle cylinder and the inner cylinder.

31. The torque sensor as claimed in claim 26, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

32. The torque sensor as claimed in claim 1, wherein
the middle cylinder has
  a first stop formed on an inner surface of the middle cylinder; and
  a second stop formed on the inner surface of the middle cylinder and separated from the first stop of the middle cylinder; and
the inner cylinder has
  a first stop formed on an outer surface of the inner cylinder, and disposed between the first and second stops of the middle cylinder; and
  a second stop formed on the outer surface of the inner cylinder, separated from the first stop of the inner cylinder, disposed between the first stop of the inner cylinder and the second stop of the middle cylinder and selectively abutting the second stop of the middle cylinder.

33. The torque sensor as claimed in claim 32, wherein the resilient element is compressible, is mounted between the first stops of the middle cylinder and the inner cylinder and has two ends respectively abutting the first stops of the middle cylinder and the inner cylinder.

34. The torque sensor as claimed in claim 33, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

35. The torque sensor as claimed in claim 32, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

36. The torque sensor as claimed in claim 1, wherein
the inner cylinder further has a mounting ring formed around an outer surface of the inner cylinder and having a side surface facing a corresponding end of the middle cylinder; and
the first disc and the second disc are disposed between the mounting ring of the inner cylinder and the end of the middle cylinder that corresponds to the mounting ring, and the first disc is attached to the mounting ring of the inner cylinder and the second disc is attached to the end of the middle cylinder that corresponds to the mounting ring.

* * * * *